United States Patent [19]

Kuromatsu

[11] Patent Number: 4,930,486
[45] Date of Patent: Jun. 5, 1990

[54] BLADE CUTTING METHOD FOR HARD BRITTLE MATERIAL

[75] Inventor: Akio Kuromatsu, Yokohama, Japan

[73] Assignee: Applied Magnetic Lab Co., Ltd., Kanagawa, Japan

[21] Appl. No.: 266,703

[22] Filed: Nov. 3, 1988

Related U.S. Application Data

[62] Division of Ser. No. 139,752, Dec. 30, 1987.

[30] Foreign Application Priority Data

Mar. 3, 1987 [JP] Japan .................................. 62-48354
Mar. 3, 1987 [JP] Japan .................................. 62-31009
Oct. 2, 1987 [JP] Japan .................................. 62-249210

[51] Int. Cl.⁵ ...................... B24B 53/007; B24B 1/04
[52] U.S. Cl. .................................. 125/11.01; 125/18; 125/16.01; 51/59.55; 51/262 A; 51/283 R; 204/129.43; 204/129.46
[58] Field of Search ............ 51/58, 59 R, 59 SS, 51/67, 68, 157, 204, 5 D, 262 A, DIG. 9, 283 R; 125/16 R, 16 L, 17, 18, 19, 11 R, DIG. 1; 204/129.46, 129.43, 224 M; 219/69 R, 69 V, 69 RS

[56] References Cited

U.S. PATENT DOCUMENTS

| | | | |
|---|---|---|---|
| 2,967,381 | 1/1961 | Brown | 51/59 SS X |
| 3,061,529 | 10/1962 | Crompton | 204/129.46 |
| 3,122,628 | 2/1964 | Inoue | 219/69 V |
| 3,176,675 | 4/1965 | Bomba | 125/18 X |
| 3,394,502 | 7/1968 | Crowe | 51/204 |
| 3,896,012 | 7/1975 | Bushbaum et al. | 204/224 M X |
| 4,187,828 | 2/1980 | Schmid | 125/18 |
| 4,236,985 | 12/1980 | Grodzinsky et al. | 204/129.43 |
| 4,596,640 | 6/1986 | Inoue | 204/129.46 |

FOREIGN PATENT DOCUMENTS 957122 2/1950 France .................................. 125/18
1206736 9/1970 United Kingdom .................. 125/18

Primary Examiner—Robert P. Olszewski
Attorney, Agent, or Firm—Lowe, Price, Leblanc, Becker & Shur

[57] ABSTRACT

A method is provided for effectively and precisely cutting metals, ceramics, composite materials and the like by use of a blade having an elongated metal band body and a conductive abrasive layer adhered to a cutting edge thereof, with a first voltage difference selectively applied continuously or intermittently between the blade and an electrode disposed close to a side of the blade. A conductive processing fluid is supplied to a cutting portion between the blade and the workpiece and the first applied voltage is preferably applied to provide a negative pole on the blade side and a positive pole on the workpiece. Electrolytic, electro-discharge and grinding operations are thus provided simultaneously, to thereby permit rapid and precise cutting of hard, bittle and difficult-to-cut materials while maintaining the cutting effectiveness of the blade. In one aspect of this method, the blade is also provided with an insulation layer on at least a metal surface, and the cutting effects are thereby improved. In another aspect of this invention, an ultrasonic input is provided at the cutting position to further increase the cutting efficiency of the apparatus. In yet another aspect of the invention, a second power source is connected to the blade and the workpiece being cut thereby and a continuous or intermittent second voltage difference is selectively applied between the blade and the workpiece.

9 Claims, 4 Drawing Sheets

BLADE CUTTING METHOD FOR HARD BRITTLE MATERIAL

This is a division of application Ser. No. 07/139,752 filed, 12/30/87.

FIELD OF THE INVENTION

This invention relates to a method and an apparatus for efficiently and precisely cutting a large workpiece and, more particularly, to a blade cutting method and apparatus for efficiently and precisely cutting hard and brittle materials, e.g., large diameter silicon compound semiconductor crystal, glass, advanced ceramics, composite materials such as FRM, steel reinforced concretes and the like, by use of a novel processing mechanism having each blade composed of mainly a metal band.

BACKGROUND OF THE PRIOR ART

In conventional cutting of rods, massive or tubular shapes made of metal materials such as steels, copper alloys, or aluminum alloys, the so-called metal sawing machine which is provided with a saw edge along a longitudinal end face of a band steel sheet made of carbide tool steel or alloy tool steel, is used.

The processing mechanism is not grinding, but is cutting, so that it is impossible to cut hard and brittle materials such as ceramics, glass, quartz, metal base composite material, intermetallic compound, and hard metal.

In the method for cutting off these above-mentioned special rod, massive, or tubular materials, there are usually two methods, as follows.

Figure 7:
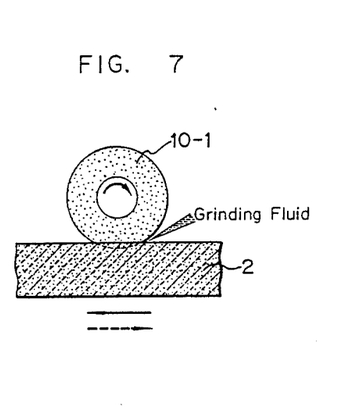
FIG. 7 shows a cutting process with an outer peripheral circular edge according to the prior art.

One cutting method is a so-called outer peripheral circular edge cutting method wherein the work 2 is pressed to be cut against a disc grindstone 10-1 which is provided on its outer periphery with an abrasive and is rotated at high speed as shown in FIG. 7.

Figure 8:
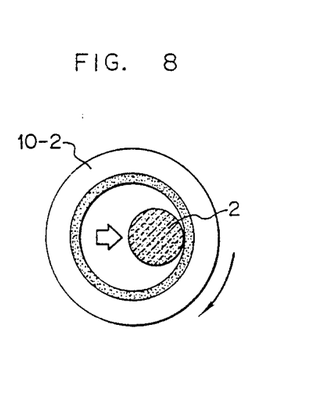
FIG. 8 shows a cutting process with an inner peripheral circular edge of the prior art.

Another cutting method is the so-called inner peripheral circular edge cutting method wherein a grindstone disc 10-2 provided on the inner periphery with an abrasive layer having a doughnut shape, as shown in FIG. 8, is rotated at high speed. The workpiece 2 is inserted into the inner circle of the grindstone disc and is cut while being pressed against the inner periphery of the grindstone disc 10-2.

The outer peripheral edge cutting method permits so-called multiple cutting to provide high cutting efficiency, and one workpiece 2 may be simultaneously cut to the desired thickness into many parts by means of a plurality of disc grindstones 10-1 laminated at regular intervals through spacers. However, in this cutting with the outer peripheral circular edge, the cutting depth of the work is limited to about one-third the outer diameter of the disc, and if it is required to cut pieces of a further large size the cutting edge is deflected and bent backwardly during machining, whereby it is impossible to process or machine the work precisely.

Accordingly, when it is required to cut materials of large diameter, the diameter of the grindstone itself must be increased. The more the diameter of the grindstone is increased, the greater the problems such as run-out of the grindstone, lower running accuracy of the machine and the like.

On the other hand, in the inner peripheral circular edge cutting method, it is possible to cut the relatively large workpiece 2 in the extent of the inner circle of the grindstone at high precision because the grindstone disc is rotated while being held at its outer periphery. It is impossible, however, to obtain a great number of cut products at the same time on account of the construction of the apparatus, which reduces the lower cutting efficiency.

To eliminate the disadvantages in these two kinds of cutting methods, a multi-blade cutting method is employed in which a plurality of band steel sheets (the blades) held in parallel at regular intervals are attached to a frame under a constant tension and the frame is then to cut the work. This cutting method has been developed to cut hard and brittle materials for semiconductors at high precision and in large quantities.

In blade cutting, there are usually three kinds of cutting methods, one of which is cutting with a metal sawing machine provided with a saw edge on the side end face as stated above, and two other cutting methods respectively involving grinding with bonded abrasive grains and free abrasive grains.

The metal sawing machine is suitable for cutting metal materials generally, as already stated, and is not used to cut special materials.

In the grinding method with bonded abrasive grains, a chip composed of an abrasive layer, which is attached to a side end of a steel sheet, is usually used in rough-cutting of easy cuttable materials such as marbles, limestones, sandstones and the like.

However, for cutting of the above-mentioned hard and brittle materials at high precision, free abrasive grains are mainly used. The multi-blade cutting method with free abrasive grains is illustrated in FIGS. 9 to 12. A plurality of elongated blades 1' made of band steels of SK material and having a thickness of approximately 0.1 to 0.3 mm are disposed mutually in parallel at regular intervals through spacers 3 and secured to the frame 10 by means of a fixture 4. Then, a tensile force as high as an elastic limit is equally applied to all the blades 1'. After the above-mentioned setting is obtained, side edges of these blades are pressed and contacted with the work 2 while imparting a predetermined press force to the work, and the blades 1' are reciprocated in the longitudinal direction to cut the work while being supplied with a slurry processing or grinding fluid carrying abrasive grains in a liquid such as an oil or a water from a slurry supply part 5'.

Figure 9:
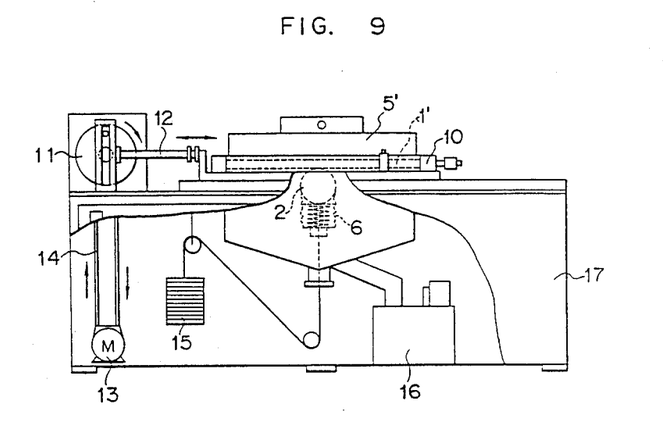
FIG. 9 shows side view of a known reciprocating mechanism of the type in which a vertical flywheel is used.
Figure 10:
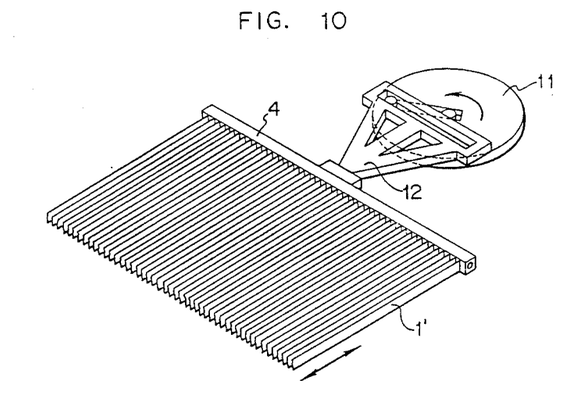
FIG. 10 shows an example of a known reciprocating mechanism using a lateral flywheel.

Reciprocation is carried out by converting the rotation of a flywheel 11 into the linear motion of a connecting rod 2. The flywheel is rotated and driven through a V-shaped belt 14 from a motor 13.

The position of a pin fixed on the flywheel 11 which is engaged with the connecting rod 12 may be slidably adjusted, thereby to regulate the reciprocating velocity and stroke. The motor 13 may be, of course, driven at variable speed.

Thus, it is possible to provide many cut products at the same time. FIG. 9 shows an example of an apparatus in which a vertical flywheel is used. In this drawing, 6 is a spring, 15 is a weight and 16 is a powder tank. FIG. 10 shows another example wherein a lateral flywheel is used.

Figures 11, 12:
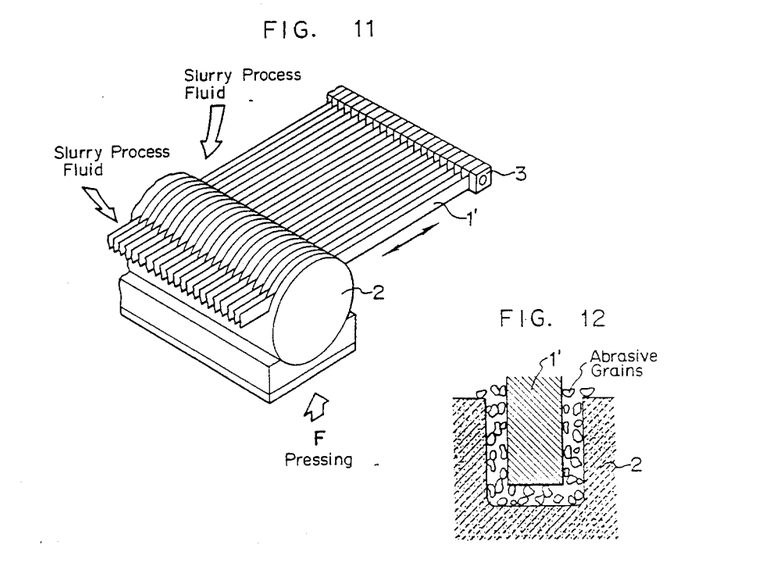
FIG. 11 shows a multi-blade cutting process of the prior art.
FIG. 12 shows a cutting mechanism with free abrasive grains of the prior art.

A cutting mechanism with free abrasive grains is shown in FIG. 12, wherein a processing fluid is supplied with abrasive grains into a gap between the blade 1 and the work 2 to roll and drag the abrasive grains by the relative motion therebetween, or to rub the work 2 with the abrasive grains, so that a fine breakage is generated in the work 2 to cause the cutting to be advanced. This method depends on a principle similar to that of the so-called lapping process.

The inherent advantages of the multi-blade cutting method with free abrasive grains are enumerated in the following points:

(1) A great number of large cut products may be simultaneously obtained.

(2) The processing or machining principle is similar to the lapping principle, so that the heat generated in processing is small and the abrasive grains may be used to provide a small stress layer.

(3) This cutting method is adapted to cut particularly hard and brittle materials, because of the lapping type cutting mechanism.

Thus, the multi-blade cutting method with free abrasive grains is characterized by that large, hard and brittle materials may be simultaneously cut precisely into many parts.

As compared with the general cutting method for cutting the work with the above-mentioned bonded abrasive grains, or a disc grindstone, the work is processed extremely slowly.

Accordingly, the processing velocity per blade is considerably low as compared with the general grindstone cutting. Therefore, even if the work may be cut in this multi-blade cutting method, the time required in each cutting operation is considerably long as compared with the ordinary grindstone cutting, so that the cutting efficiency is not promoted as expected.

Under these conditions, this multi-blade cutting method is limited to be used only in the special materials field. In this cutting method, adding to the above-mentioned disadvantages, there are also various problems as described below.

Firstly, in this cutting method, since a large quantity of abrasive grains are mixed with the liquid to continuously supply a slurry of abrasive grains to the cutting part so as to dissipate about one-third the quantity of abrasive grains, it is impractical to use expensive super abrasive grains, such as diamonds, CBN and the like, and only inexpensive abrasive grains of low hardness, such as SiC (GC) abrasive grains are commonly used. Consequently, the work to be cut is limited to relatively soft and brittle materials of Moore hardness of less than 7.

Secondly, this cutting method disfavored in view of the air pollution it causes because the apparatus and its surroundings generate a considerably nasty smell since the work is processed or machined while a slurry of free abrasive grains with oil and the like is supplied to the cutting part.

Moreover, this cutting method is similar to the lapping process in the processing principle, so that the work and blades are rubbed with the free abrasive grains of high hardness and this shortens the life of the blades. Consequently, the blades must be changed frequently and the apparatus is driven at a low processing speed and must be frequently stopped.

Also, when new materials which are recently developed and practised are cut, the blades are frequently exchanged during processing, and the cut surface of the work is changed in the exchange of the blades, which reduces the commercial values of cut products.

Thus, the multi-blade cutting method with free abrasive grains is not adapted to use in cutting of hard-to-machine new raw materials such as new ceramics, composite materials, and intermetallic compounds.

SUMMARY OF THE INVENTION

Accordingly, an object of this invention is to provide a blade cutting method and apparatus with a novel cutting mechanism which puts the advantages of the multi-blade cutting method to practical use and overcomes the disadvantages thereof.

Another object of this invention is to eliminate cutting with lapping of low machining efficiency, and to cut large materials rapidly and precisely by use of blades having bonded abrasive grains.

A further object of this invention is to reduce the loading of blades by use of an electro-chemical operation so as to keep blade edges sharp for a long time. Accordingly, the dissipation of abrasive grains is reduced and the life of blades is considerably increased as compared with the prior art, so that it is possible to keep sufficient economy even in using super abrasive grains.

A further object of this invention is to provide a novel processing or machining mechanism which operates in a composite operation including not only a mechanical removing operation, but also other electrical and electro-chemical operations and moreover, including other machining principles.

According to this machining or processing principle, this invention permits the use of super abrasive grains and the precise cutting of all large raw materials having a variety of physical properties, such as metals, new ceramics, composite materials, and the like.

An even further object of this invention is to increase the relative velocity between the work and the blades to promote the processing or machining speed.

A basic construction of this invention concerns a blade type cutting apparatus which comprises at least one blade made of an elongated metal band and provided with a conductive abrasive layer on its sides, a tension means provided on at least one end of the blade, a press means for applying a desired press force between the abrasive layer of the blade and the workpiece, a driving means for producing a relative motion between the blade and the work to be machined in the longitudinal direction of the blade, an electrode disposed adjacent the side of the abrasive layer of the blade, a dressing power source for continuously or intermittently applying a voltage between the electrode and the blade to provide a positive pole on the blade, and means for supplying a conductive processing fluid to at least a processing or machining part between the blade and the work, and between the electrode and the blade.

The above-mentioned objects are achieved by continuously or intermittently applying a voltage between the blade and the work to provide a positive pole on the work and, moreover, applying a supersonic vibration to at least one of the blade, the work and the processing fluid.

The construction of this invention should be, moreover, understood with its operation from the illustration described below.

The work may be cut at a processing speed which is considerably higher than that expected in the conventional blade cutting, by using each blade provided on a longitudinal side end face with an abrasive grain bonded edge instead of a metal plate composed of only equal raw materials, supplying a normal grinding fluid instead of a slurry containing free abrasive grains into a contact portion (cutting part) between the work and each blade, and applying a predetermined press force therebetween to carry out the cutting process while producing the relative motion therebetween in the longitudinal direction of the blades.

In respect of abrasive grains, super abrasive grains such as diamonds, CBN and the like are well suited for use in this cutting apparatus because of low dissipation of bonded abrasive grains and improved processing efficiency.

However, when the work is cut with only the blade having the edge made of these bonded abrasive grains, the loading occurs in some work during processing to lower gradually the sharpness of the blade edge.

It is well known to dress a grindstone so as to reduce the loading thereon. In the normal dressing, a dresser is continuously or intermittently pressed against the work during processing to remove mechanically the loading and abrasive grains on the surface of the grindstone so as to dress or correct the grindstone. It is known that, in the normal dresser, abrasive grains of the blade are considerably dissipated and act to shorten the life of the blade. At the same time, the diamonds of the dresser are dissipated and much time is needed in maintenance and exchange of the dresser. Such dissipation often occurs in cutting particularly hard and brittle materials such as advanced ceramics and the like, or with high viscous aluminum system or nickel system composite materials.

According to this invention, the sharpest cutting is maintained for a long time in the process applying a conductivity to abrasive grains adhered to a blade and using a conductive grinding fluid approaching or lightly contacting the abrasive layer (edge) of the blade with an electrode having the conductivity and corrosion and made of easy-machining material (for example, graphite or sintered material containing graphite), continuously or intermittently applying a voltage between the blade and the electrode to provide a positive pole on the blade, and supplying the grinding fluid.

This depends on unloading during processing because the abrasive layer is dressed under electrolytic and electro-discharge operations. Then, mechanical releasing on the abrasive layer is hardly generated by the dressing operation, so that only a small quantity of abrasive grains are dissipated and at the same time, the electrode which is used as a dresser is hardly dissipated, thus promoting a processing or machining speed considerably so as to permit use for a long time.

As a means for adhering abrasive grains to a blade, any known metal bond, resin bond, and electro-deposition may be used. In the metal bond, copper alloy, iron alloy or nickel alloy may be used as the bond metal, and in the resin bond, epoxy resin, phenol resin, or other resin is mixed with metal powders to provide a conductive adhesive. In addition, a resin-bonded abrasive layer may be deposited and immersed with the metal and the abrasive grains may be also coated with the metal. The electro-deposition permits the use of nickel and nickel alloy, copper and copper alloy, iron and iron alloy, and the like as a deposition layer.

In the present invention, in addition to the above-mentioned processing method, when a voltage is continuously or intermittently applied between the work and the blade, three operations, grinding, electrolytic, and electro-discharge operations are directed to the work, and the combined effects thereof increase the processing speed considerably.

This is one of the important elements for constituting a cutting mechanism with application of the above-mentioned dressing voltage. Among the differences between the operational principles of this invention and the normal electrolytic grinding, it should be fully understood that this invention differs from the normal electrolytic grinding in applying an adequate depress force between a work and a blade edge part.

In the electrolytic grinding as well known, a nearly contacted relation is maintained between a work electrode (+) and a grindstone electrode (−) as well as the relation between the above-mentioned blade and a dressing electrode to produce the electrolytic operation on the work surface so as to scrape off and remove electrolytic products from the grindstone.

This invention, however, has a considerable difference with respect to the electrolytic grinding in pressing the abrasive layer of a blade to the work under an adequate force to generate a mechanical grinding operation with abrasive grains utilized to the fullest. It should be also noted in this invention that in metal-cutting work the electrolytic and electro-discharge operations are simultaneously produced with the mechanical grinding, and in cutting non-metal the electro-discharge operation is produced with the mechanical grinding.

While the entire operational principle is not fully understood, it is considered that abrasive grains of non-conductive materials are always contacted with a work, and conductive materials (metals) with which the abrasive grains are mixed or coated are repeatedly contacted and uncontacted with the workpiece. It is believed that due to this an electrolytic operation is produced through the conductive grinding fluid between the conductive materials and the work when they are not contacted with each other, and an energetic electro-discharge operation is produced at transfer points from the contacted state to the uncontacted state and vice versa between the conductive materials and the work. Then, it should be particularly noted that the abrasive layer of the blade is not required to be of the so-called segment type with alternately arranged regions of conductive materials and other regions of abrasive layers of non-conductive materials, and the abrasive layer preferably forms only edge parts contacted with the work from the conductive materials as stated above.

BRIEF DESCRIPTION OF THE DRAWINGS

FIG. 3(a) and (b) respectively show side views of a blade having a continuous edge and a blade having an intermittent edge, which are used in the apparatus according to this invention;

FIG. 4(a) and (b) respectively show front end face views of the blades shown in FIG. 4(a) and (b);

FIG. 5(a), (b) and 6(a) respectively show bottom plan views of blade edges in other forms;

FIG. 6(b) shows a side view of the blade shown in FIG. 6(a).

DESCRIPTION OF THE PREFERRED EMBODIMENTS

Figure 1:
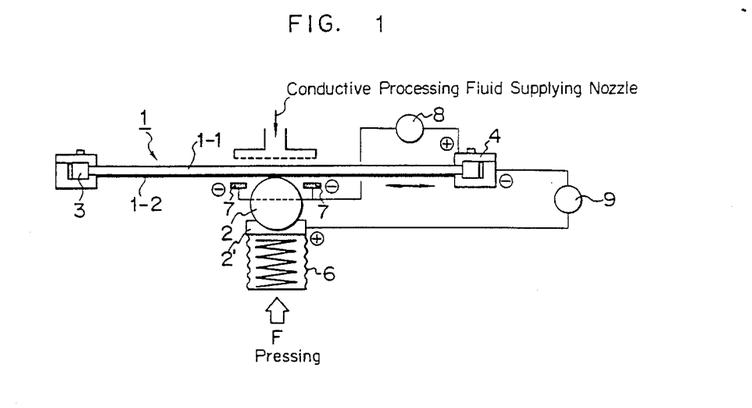
FIG. 1 shows a schematic construction of a multi-blade cutting apparatus according to a preferred embodiment of this invention.

FIG. 1 shows schematically a representative construction of this invention as stated above.

In the drawings, a body 1-1 of a blade is ordinarily made of a special steel such as NS steel and is formed to provide an elongated metal band having a length of 100–900 m/m, a thickness of 0.1–0.8 m/m, and a width of 5–15 m/m, and abrasive layers 1-2 are formed on at least one side face of the body 1-1 as shown in FIGS. 3–6.

This abrasive layer 1-2 is conductive as mentioned above and is continuously provided along one side of the blade 1 to form a so-called continuous edge as shown in FIG. 3(a) and 4(a), or may be intermittently provided therealong to form a so-called intermittent edge as shown in FIG. 3(b), 4(b), 5, and 6. Both the front and back ends off the blades 1 are secured with or without the spacers 3 to fixtures 4, the position of which is regulated in a frame by known means in drawings to impart a tensile force to blades 1.

Workpiece 2 is to be machined, i.e., cut, and is secured through an adhesive to a work mounting table 2'. A bellows set with a compression spring 6 therein is attached to a lower surface of the work attaching table 2' and a constant press force F is always applied upwardly to the lower surface of the table through a known lever mechanism.

A mechanism for reciprocating blades 1 on the work 2 can use the conventional known mechanism, for example as shown in FIG. 9 and FIG. 10.

A dressing electrode 7, formed of graphite, copper and the like, is disposed opposite to the end face of the abrasive layer of blade 1 to provide such a small gap that the dressing electrode and the blade are nearly contacted with each other.

A voltage is applied between the electrode 7 and the blade 1 through fixtures 4 from a dress power source 8 to provide a positive or plus pole continuously or intermittently at the blade side 1. This dressing voltage is preferably held at about 30 volts.

A processing or machining power source 9 is provided between the blade 1 and the work 2 to apply a voltage so as to provide a plus pole continuously or intermittently at the work side 2. This processing voltage is preferably in the range of 120–200 V.

The dressing power source 8 and processing power source 9, may be selected to be direct current power source and alternating current power source, but may also be pulse power sources.

A processing or grinding fluid supplying nozzle is provided for supplying a conductive progressing fluid, a conductive processing fluid containing, for example, a little $NaNO_3$ is used as described later.

The above-mentioned apparatus is an example of a so-called multi-blade cutting apparatus for slicing one workpiece into plural parts by means of a plurality of blades, and this invention therefore includes not only multi-blade cutting, but also single blade cutting.

Figure 2:
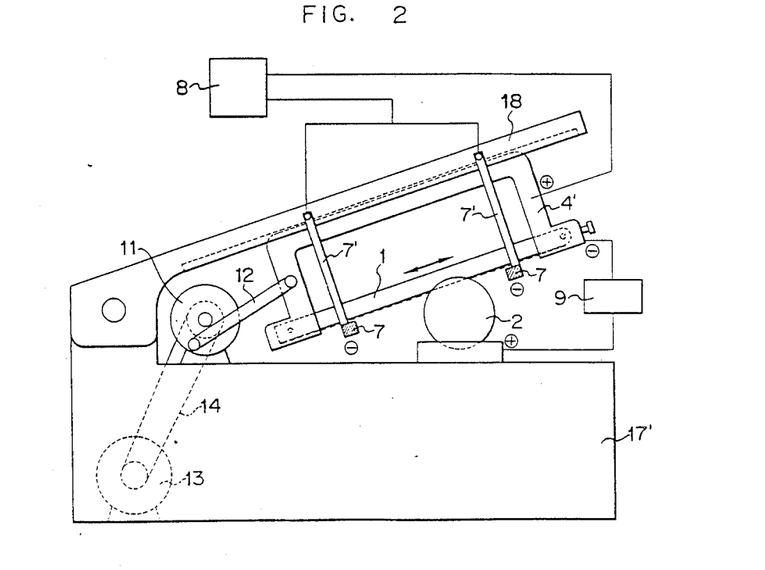
FIG. 2 shows a schematic construction of a single blade cutting apparatus according to this invention.
Figure 3:
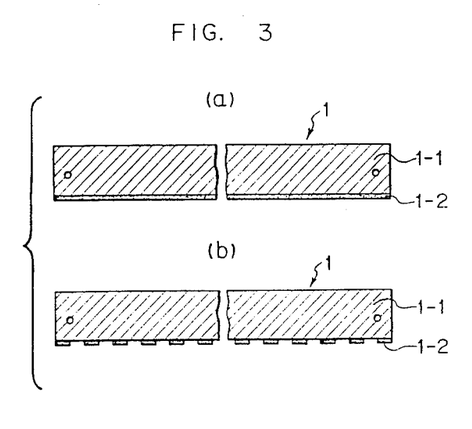
Figure 4:
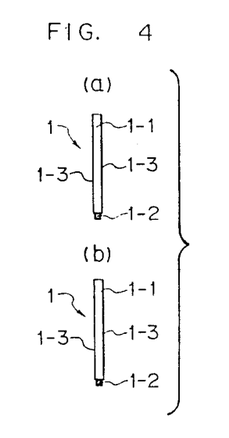

FIG. 2 shows a single blade cutting apparatus according to this invention which may be provided as an improvement of the conventional metal sawing machine. In the construction of the conventional metal sawing machine, in many respects similar to that shown in FIG. 2, a blade-fixing U-shaped frame 4' is slidably engaged with a lower surface of an arm 18, one end of which is connected pivotally to a machine bed 17'. A blade 1 is fixed between opposite ends of the blade fixing frame 4', a part of which is connected through a connecting rod 12 to an eccentric position on a wheel 11 which is driven from a motor 3. The workpiece 2 is also set by a work-fixing fixture 2' on the machine bed to be held opposite to the edge part of the blade 1.

According to this invention, such a conventional metal sawing machine is improved by electrodes 7 that are fixed through conductive links 7' to the arm 18 in an access relation, whether or not they are contacted with the abrasive layer of blade, and a voltage is applied through a dressing electric lead 8 between the blade 1 and the electrodes 7 to provide continuously or intermittently a positive or plus pole on a blade side 1, while a voltage is applied from a processing power source 9 to between the blade 1 and the work 3 to provide a negative or minus pole on the blade side.

Figure 5:
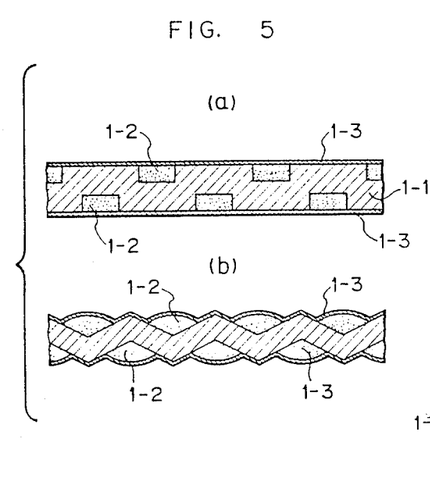
Figure 6:
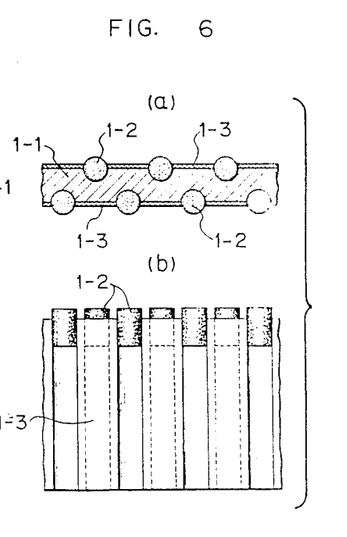

The blade 1 may be made of the same construction as the blades used in multiple cutting, but, in an alternative form thereof chip bonded abrasive grains with a proper bonding agent are adhered to the blade end face by soldering to form intermittent blade edges as shown in FIGS. 5 and 6.

Moreover, although the above-mentioned processing or grinding fluid is not explicitly shown in FIG. f2, it is supplied to the cutting part and the electrode section.

The above-mentioned single blade cutting apparatus permits cutting not only of general metal materials but also allows the above-mentioned hard and brittle materials, which cannot cut in the conventional metal sawing machine, to be efficiently and precisely cut.

Studies of the processing speed as a function of physical conditions on the side of a blade provided on an end face with an abrasive layer indicate that electrolytic and electro-discharge operations occur actively to promote the processing speed considerably if an insulation layer 1-3 is formed on the side of the blade body 1-1, as shown in FIGS. 5 and 6.

It is believed that when electrolytic and electro-discharge operations are restrained between a blade side not used directly in the cutting process and the workpiece by the existence of the insulation layer 1-3, the processing power in the electrolytic and electro-discharge operations is expended between the face of the blade edge used directly in cutting process (that is, a side face of a blade 1 contacted with the workpiece 2) and workpiece 2.

The insulation layer 1-3 may also be formed along the entire side of the abrasive layer and the blade body 1 (FIG. 5a, b) or along only the side of the blade body 1 (FIG. 6a, b).

It has also been discovered that in the cutting process, the processing speed is promoted when the work is rotated or swung about an axis perpendicular to the blade edge.

This fact depends on the fact that the contact between the end face of the blade edge and the work is a point contact in the case of cutting of the workpiece while imparting the rotation or swinging motion, as opposed to a line contact in the case of cutting of the workpiece without imparting the rotation or swinging motion. The electro-discharge or mechanical grinding operation is applied to the work 2 through a point contact at an efficiency higher than in the case of the line contact.

Applying rotation to the workpiece 2 provides other advantages as well.

In the conventional cutting method, one or both of a group of blades 1' is secured to fixtures and a work 2 is pushed against the group of blades 1' which are reciprocated to cut the work 2. This can generate considerable vibration of the apparatus in high frequency reciprocation, because the fixtures secured to the group of blades 1', the frame, and the workpiece, ordinarily made of cast iron or special steel, have relatively heavy weights and large inertial moments.

The reciprocation which is converted from a rotary motion into a linear motion, is also reason why the apparatus cannot be driven at high speed.

Therefore, the relative speed of the work and the tool (blade) is limited to about 20 m/min, so that it is impossible to realize a relative speed as high as that of general grindstone cutting, e.g., a relative speed of the order of 1,000 m/min.

However, if a work 2 is preshaped cylindrically to set a center axis thereof perpendicular to the blade side so as to cut it while rotating it, the apparatus can be protected against vibration to realize a relative speed as high as that of general grindstone cutting and to increase the processing speed considerably.

Studies of methods for supplying the processing fluid indicate that a cutting process for immersing the whole of the work 2 and the blade fixtures 4 secured to the blade 1 in the processing fluid makes for better sharpening of the edge than a process supplying a processing fluid from nozzles to a contact part between the blade 1 and the work 2, to provide a higher processing speed. It is believed that in the former technique, the processing fluid is more effectively provided to the contact part between the blade 1 and the work 2, and is smoothly circulated in the contact part.

It has also been discovered that when an ultrasonic vibration is applied to at least one of the workpiece, the blade and the processing fluid, a loading of a blade edge is reduced and it maintains better sharpening in comparison with the case of applying only an electrolytic dressing during processing.

In applying the ultrasonic vibration to the processing fluid, it is particularly effective if the loop of the ultrasonic vibration is set at the end face of the edge of the blade.

The detailed embodiment of this invention is illustrated with an example of a conventional blade cutting and its comparative example.

The basic construction parts of an apparatus which is used for embodying this invention, are also schematically illustrated in FIGS. 1 and 2.

The multi-blade cutting apparatus shown in FIG. 1 differs from the conventional apparatus in that a blade 1 is provided with a conductive abrasive layer, in that dressing electrodes (negative or minus poles) 7,7 are disposed in the cutting portion and a current may be applied between the dressing electrode 7 and the fixture (positive or plus pole) 4 through a dressing power source with the fixture (negative or minus pole) 4, and in that the conductive processing fluid is supplied from a processing fluid supplying nozzle.

FIG. 2 shows a single blade cutting apparatus which provides a dressing power source 8, a dressing electrodes 7, and a processing power source 9 in the conventional metal sawing machine, and permits the flow of a current from the dressing power source 8 to provide minus poles on the dressing electrodes 7 and a plus pole on the blade 1 and permits the flow of a current from the processing power source 9 to provide a plus pole on the workpiece 2 and a minus pole on the blade 1.

A processing fluid supplying nozzle, which is not shown in FIG. 2, is also set against the cutting part of the single blade as in the above-mentioned multi-blade cutting case.

Examples illustrative of the advantages provided by this invention over the prior art are presented below.

EXAMPLE (1)

The cast mass of Sendust alloy which is a hard and brittle material of 120 m/m × 120 m/m × 300 m/m is sliced under conditions shown in Table 1 respectively by a conventional blade cutting method used with conventional free abrasive grains, a comparative cutting method used with a bonded abrasive edge attached blade, and a cutting method carried out in the apparatus of this invention, to compare the processing efficiency and the wear degree of the blade with each other.

TABLE 1

| Kinds | Processing method Comparative Items | Conventional method (Blade cutting method) | Comparative method | Method of this invention (1) | (2) | (3) |
|---|---|---|---|---|---|---|
| Cutting Conditions | Blade size (m/m) | 0.3 × 10 × 500 | 0.3 × 10 × 500 | 0.3 × 10 × 500 | | |
| | Blade edge material | Without blade edge | Metal bonded diamond (concentration 100) | Metal bonded diamond (concentration 100) | | |
| | Used abrasive grains | GC (180 mesh free abrasive grains) | Diamond (180 mesh) | Diamond (180 mesh) | | |
| | Number of blades | 20 | 20 | 20 | 20 | 20 |
| | Interval between blades (mm) | 0.7 | 0.7 | 0.7 | 0.7 | 0.7 |
| | Stroke (m/m) | 250 | 250 | 250 | 250 | 250 |
| | Number of reciprocation (times/min.) | 100 | 100 | 100 | 100 | 100 |
| | Load (Kg) | 10 | 10 | 10 | 10 | 10 |
| | Dressing voltage (V) | — | — | 30 | 30 | 30 |
| | Processing voltage (V) | — | — | 0 | 90 | 150 |
| | Processing fluid | Abrasives 150 gr + machine oil 500 cc | Conductive processing fluid containing 0.5% NaNO$_3$ | Conductive processing fluid containing 0.5% NaNO$_3$ | | |
| Effects | Cutting speed (m/m/hr) | 1.6 | 3 (average) | 12 | 18 | 32 |
| | Time required in full cutting (hr) | 79 (blade exchange of 4 times) | 42 | 10 | 6.7 | 3.8 |
| | Number for exchanging blades | 4 (for wearing) | 2 (for loading) | 0 | 0 | 0 |
| | Decreased amount of | 23 (total) | 0.08 | 0.03 | 0.04 | 0.05 |

TABLE 1-continued

| Kinds | Processing method Comparative Items | Conventional method (Blade cutting method) | Comparative method | Method of this invention (1) | (2) | (3) |
|---|---|---|---|---|---|---|
| | blade width (worn amount)(m/m) | | | | | |

As appears from the above results, it will be found that the cutting method carried out in the apparatus of this invention provides a surprisingly high cutting speed increase of 4 to 20 times and an extremely small wear of the blade as compared with the conventional and comparative methods.

Note should be particularly taken of the numbers of blade exchanges. In the cutting method carried out in the apparatus of the invention, the blade exchange is zero because the work may be cut at one stretch, however, it is required four times in the conventional method and two times in the comparative method. The blade exchange becomes a fatal defect in the case of the precision cutting such as this invention, because the stress on processed surface of the work occurs in the exchange part of the blade and causes loss of product value of the work even if the blades are exchanged with the greatest possible care.

Moreover, in the conventional method, the blades must be exchanged four times during the processing because they are worn progressively and cannot be reused, and the time required in full cutting is practically increased beyond the time calculated from the cutting speed because of adding of the exchange time to the cutting time.

In the comparative cutting method, the cutting speed is relatively fast in the intial stage of the processing, however, it slows down later because of loading, and the blades must be exchanged twice during the processing. The average of the cutting speed therefore remains low.

Clearly, the cutting method according to this invention permits high cutting speed and low wear of the blade edge, so that the time required in the full cutting may be considerably shortened as compared with the conventional method because it is not required to stop the machine, and uniformly cut sections may be obtained advantageously as taught herein.

EXAMPLE (2)

A cast mass of Ni-Ti super elastic alloy (56 wt % Ni-44 wt % Ti, 100 m/m×100 m/m×250 m/m) which is one of difficultcuttable materials was cut by the use of four kinds of following blades (1)-(4), whereby it is examined that the shape of the blade edge and the insulation coating of the blade side exert influences on the cutting speed.

(1) A blade for alternately disposing parts of the abrasive layer adhered to the side face of the blade at intervals of 5 m/m and parts free of the abrasive layer along the whole length of the blade—blade A (intermittent edge blade).

(2) A blade for forming an insulation layer made of silicon nitride and having a thickness of about 5 μm on both sides of the blade A, deposited by a known ion depositing method—blade B (intermittent edge blade).

(3) A blade for uniformly and continuously adhering the edge to the end face along the length—blade C (continuous edge blade).

(4) A blade for forming the insulation layer on the side of the blade C as well as the blade B—blade D (continuous edge blade).

The processing was under the same conditions as in the example (1), except for the following items:

| | |
|---|---|
| Number of blade attaching plates | ten in each case |
| Load (all loads) | 6 Kg |
| Processing Voltage | 120 V (D.C.) |
| Dressing Voltage | 30 V (D.C.) |

The results are shown in Table 2.

TABLE 2

| Comparative Items | Blade Exchange | | | | |
|---|---|---|---|---|---|
| | Conventional method | Blade A | Blade B | Blade C | Blade D |
| Time required in cutting (hr) | 92 (blade exchange of five times) | 4.5 | 3.4 | 5.3 | 4.1 |
| Decreased amount of blade width (worn amount m/m) | 27 (total) | 0.08 | 0.10 | 0.05 | 0.06 |

It may be understood from this Table that notches of blade edge and insulation of blade side causes effective improvement of processing speed.

The wear of the blade edge is increased for the intermittent edge because it is subjected to a larger load per unit length per unit length than is the continuous edge. When the side of the blade is insulated, the processing current flows collectively through the end face of the blade edge to increase the wear of the blade, however, the increased wear amount is small in light of the improved processing speed. Therefore, it is advantageous to form an insulation layer on the side of the blade.

EXAMPLE (3)

A columnar raw material of an intermetallic compound TiAl having a diameter of 100 m/m and length of 300 m/m was cut by means of the apparatus of this invention. The cutting speeds were compared between imparting a motion rotating about a center axis of the column to the raw material and in a case imparting to the raw material a motion swinging by 10 degrees at right and left about an axis which is perpendicular to blade side, parallel to the center axis of the column and disposed at the lower eccentric position of 60 m/m from the center axis.

The processing conditions are the same as in example (2), except for the following items.

| | |
|---|---|
| Blade size | 0.4 m/m × 10 m/m (width) × 500 m/m (length). |
| Quality of material of edge part | metal bond grindstone (CBN concentration 100) used with 180 mesh CBN abrasive grains. |
| Shape of edge part | (1) intermittent edge in which edge parts of length 3 m/m and parts of 2 m/m without the edge are disposed |

-continued alternately on a blade.
(2) continuous edge.

Side having insulation layer.
The results shown in Table 3 wwere obtained.

TABLE 3

| Motion of work | Blade edge shape | |
|---|---|---|
| | Continuous edge | Intermittent edge |
| Without rotation | 25 m/m/hr | 31 m/m/hr |
| Rotation (10 rpm) | 48 m/m/hr | 61 m/m/hr |
| Rotation (1000 rpm) | 122 m/m/hr | 194 m/m/hr |
| Swing (10 reciprocation/minute | 40 m/m/hr | 51 m/m/hr |

From the above-mentioned results, it will be found that the rotation or swinging of the work causes significant improvement of the processing speed. In comparing the continuous edge and intermittent edge with each other, it is found that the latter has far better effects than the former in the case for imparting the rotation to the work.

EXAMPLE (4)

A round rod of silicon nitride, a ceramic material, having a diameter of 50 m/m and length of 250 m/m was cut under the following conditions by changing the supplying ways of the processing fluid, whereby the influences exerted on the cutting speed are compared for the different fluid-supplying ways.

| Blade size | 0.3 m/m (thickness) × 10 m/m (width) × 500 m/m length. |
|---|---|
| Quality of material of blade edge | metal bond grindstone used with 220 mesh diamond abrasive grains (diamond concentration 100). |
| Shape of blade edge | intermittent edge in which edge parts of length 4 m/m and parts of 1 m/m without the edge are alternately arranged on the blade. |
| Blade set number | 10. |
| Stroke | 200 m/m. |
| Blade of reciprocating number | 120 times/min. |
| Load | 3 Kg. |
| Processing voltage | 90 V. |
| Dressing voltage | 30 V. |
| Processing fluid | the same fluid as the example (1) |
| Supplying method of processing fluid | (1) injection with nozzle from the upper part of the blade into the contact part between blade and work.<br>(2) immersion of the work and the entire blades in the processing fluid. |

Consequently, the cutting times are 4.8 hours in the case of injection of the processing fluid and 3.9 hours in the case of immersion in the processing fluid. From the data, it is concluded that processing fluid-supplying ways may exert influences on the cutting speed and that the work and tool may be immersed completely in the processing fluid in spite of difficult realization in the conventional cutting method, whereby the cutting speed may be effectively improved.

EXAMPLE (5)

The influences exerted on the cutting speed are examined by applying ultrasonic vibration to the work, the blade and the processing fluid respectively in cutting a round rod of a stable zirconium having a diameter of 50 m/m and length 300 m/m.

The processing conditions are the same as in the example (4), except for the following items:

| Supplying method of processing fluid | Immersion of the work and the whole blades in the processing fluid. |
|---|---|
| Applying method of ultrasonic vibration | (1) actuation by attaching a vibrator to blade fixtures;<br>(2) actuation by attaching the vibrator to a work attaching table;<br>(3) regulation for setting the vibrator in the processing fluid to free the vibration surface and to provide the loop of the vibration on the end face of blade edge;<br>(4) combination of (1) and (3);<br>(5) combination of (2) and (3); |
| Power of ultrasonics | 600 V. |

Consequently, the cutting speeds are 20 m/m /hr in case (1), 26 m/m /hr in case (2), 20 m/m /hr in case (3), 36 m/m /hr in case (4) and 33m/m /hr in case (5), as compared with 15 m/m /hr in the case where ultrasonic power is not applied. From the above-mentioned results, it is concluded the cutting speed may be improved by the ultrasonic vibration, and that considerable benefits may be expected when the ultrasonic vibration is applied to the processing fluid.

The embodiment with single blade cutting is examined in the following comparative examples.

EXAMPLE (6)

Single Blade Cutting of Quartz or Alumina

A quartz block and an alumina block were cut under the following conditions to compare the case without application of a dressing voltage (comparative example) with the case of the conventional method (metal-saw cutting).

| Blade size | 1.2 m/m × 25 m/m × 350 m/m. |
|---|---|
| Shape of blade edge | Blade edge in which grindstone chips having a length of 10 m/m and projected amount of 1.0 m/m are adhered at intervals of 3 m/m to one end face of a blade. |
| Material quality of blade edge | Metal bond diamond (grain size 120 mesh, concentration 100). |
| Stroke | 200 m/m. |
| Number of reciprocation | 60 times/min. |
| Load | 10 Kg. |
| Dressing voltage | 40 V. |

Consequently, in the case of the apparatus of this embodiment, the quartz block and the alumina block may be cut off by the required times of 20 minutes and 50 minutes respectively.

On the contrary, in the case using a conventional saw edge, the saw edge was broken shortly after cutting start in both cases and cutting was stopped at a cutting depth of about 1 m/m in the quartz block and at a cutting depth of less than 1 m/m in the alumina block respectively.

When the dressing voltage is zero under the above-mentioned processing conditions, the loading of the grindstone during processing lead to stopping of the cutting at a cutting depth of 23 m/m in the quartz block and at a cutting depth of 9 m/m in the alumina block respectively.

EXAMPLE (7)

Single Blade Cutting of Hard and Brittle Difficult-to-Cut Alloy

A hard metal and a shape-memory Ni-Ti alloy were cut by this apparatus and the results compared with the case of the conventional method (metal saw cutting).

The processing voltage and the dressing voltage in the cutting of the apparatus of this invention are as follows and the other processing conditions are the same conditions as in example (6).

| Processing | 0 V, 60 V, 120 V. |
|---|---|
| Dressing voltage | 30 V. |

Consequently, the times (minutes) required in cutting were obtained as shown in Table 4.

TABLE 4

| | Processing method | | | |
|---|---|---|---|---|
| | | This inventive method | | |
| Work | Conventional method | Processing voltage 0 V | Processing voltage 60 V | Processing voltage 120 V |
| Hard metal | Impossible in cutting* | 167 (min.) | 75 (min.) | 52 (min.) |
| Shape-memory Ni—Ti alloy | Impossible in cutting** | 114 (min.) | 61 (min.) | 40 (min.) |

*It is wholly impossilbe to cut because of breakage of edge (cutting depth is zero).
**It is impossible to cut further because the edge is broken when the edge reaches a cutting depth of 6 /.

What is claimed is:

1. A method for cutting a hard workpiece with an elongate metal band blade maintained under tension and reciprocated with a longitudinal cutting edge pressed against the workpiece, comprising the steps of:
   providing an abrasive electrically conductive layer attached to the blade at said longitudinal cutting edge;
   connecting a first power source to the blade and to an electrode held stationary and close to the conductive abrasive layer, for thereby slectively applying a continuous or intermittent voltage difference between the blade and the electrode so as to provide a positive pole to the blade;
   supplying an electrically conductive processing fluid to at least a processing portion between said blade and said workpiece and between said blade and said electrode; and
   connecting a second power source to the blade and to the workpiece, for thereby selectively applying a continuous or intermittent voltage difference between the blade and the workpiece such that said workpiece thereby is a positive pole with respect to said blade.

2. The blade cutting method according to claim 1, wherein:
   an insulation layer is formed on at least a metal surface of both sides of said blade.

3. The blade cutting method of claim 1, comprising the further step of:
   spraying a conductive processing fluid from nozzles where the blade is cutting the workpiece.

4. The blade cutting method of claim 1 comprising the further step of:
   supplying a conductive processing fluid where the blade is cutting the workpiece by immersing the blade and the workpiece in said conductive processing fluid.

5. The blade cutting method of claim 4, comprising the further step of:
   applying a supersonic vibration to at least one of said blade, said workpiece and said processing fluid.

6. The blade cutting method of claim 1, comprising the further step of:
   rotating or swinging said workpiece about an axis perpendicular to said reciprocating blade.

7. The blade cutting method of claim 6, comprising the further step of:
   spraying a conductive processing fluid from nozzles where the blade is cutting the workpiece.

8. The blade cutting method of claim 6, comprising the further step of:
   supplying a conductive processing fluid where the blade is cutting the workpiece by immersing the blade and the workpiece in said conductive processing fluid.

9. The blade cutting method of claim 8, comprising the further step of:
   applying a supersonic vibration to at least one of said blade, said workpiece and said processing fluid.

* * * * *